(12) United States Patent    (10) Patent No.: US 8,794,384 B1
Holford                     (45) Date of Patent: Aug. 5, 2014

(54) HUNTING BLIND

(71) Applicant: Michael Holford, Tecumseh, OK (US)

(72) Inventor: Michael Holford, Tecumseh, OK (US)

( * ) Notice: Subject to any disclaimer, the term of this patent is extended or adjusted under 35 U.S.C. 154(b) by 0 days.

(21) Appl. No.: 13/772,592

(22) Filed: Feb. 21, 2013

Related U.S. Application Data

(60) Provisional application No. 61/601,260, filed on Feb. 21, 2012.

(51) Int. Cl.
*A01M 31/02* (2006.01)
*E04H 15/04* (2006.01)

(52) U.S. Cl.
USPC ........................................................ 182/187

(58) Field of Classification Search
CPC .............................. A01M 31/025; E04H 15/04
USPC ........................................................ 182/187
See application file for complete search history.

(56) References Cited

U.S. PATENT DOCUMENTS

| | | | |
|---|---|---|---|
| 2,760,706 A * | 8/1956 | Pearl | 182/211 |
| 3,116,808 A | 1/1964 | Riley | |
| 3,609,905 A * | 10/1971 | Fuhrman et al. | 43/1 |
| 4,951,696 A | 8/1990 | Jones, Sr. | |
| 5,613,512 A | 3/1997 | Bean | |
| 5,669,403 A | 9/1997 | Belcher et al. | |
| 6,243,979 B1 | 6/2001 | Seats et al. | |
| 6,505,707 B1 * | 1/2003 | Berry | 182/20 |
| 7,182,091 B2 | 2/2007 | Maddox | |
| 7,219,680 B1 * | 5/2007 | Gresock | 135/90 |
| 7,246,630 B1 | 7/2007 | Ransom et al. | |
| 7,454,859 B2 * | 11/2008 | Buckner | 42/94 |
| 7,971,685 B2 * | 7/2011 | Simone et al. | 182/133 |
| 2006/0249640 A1 | 11/2006 | Hanson | |
| 2007/0017744 A1 | 1/2007 | Jacks | |
| 2013/0341976 A1 * | 12/2013 | Birch | 297/184.14 |

* cited by examiner

*Primary Examiner* — Alvin Chin-Shue
(74) *Attorney, Agent, or Firm* — Robert C. Montgomery; Montgomery Patent & Design

(57) ABSTRACT

A firing support hunting blind particularly adapted for use in an existing tree stand includes a firing support structure and a textile hunting blind assembly. The device attaches to the tree using a ratcheting mechanism being positioned above the tree stand above the base of the tree. The device supports a padded circular rail which acts as a safety barrier, supports a camouflage curtain which conceals the user, and provides a solid comfortable support for the user's arms and/or a firearm during shooting. The various components of the device can be disassembled and transported.

16 Claims, 5 Drawing Sheets

HUNTING BLIND

RELATED APPLICATIONS

The present invention was first described in U.S. Patent Provisional No. 61/601,260 filed on Feb. 21, 2012 the entire disclosures of which are incorporated herein by reference.

FIELD OF THE INVENTION

The present invention relates generally to a hunting support device that is adjustably and removably attached to a tree, further having a support for a firearm and means to suspend a hunting blind therefrom.

BACKGROUND OF THE INVENTION

When engaging in the sport of hunting, or merely nature observing, versatility of the equipment of the hunter/observer is an important feature. Both activities require stealth and mobility. Typically, there is an inverse relationship associated with the ability to maintain stealth and the ability to maintain mobility. Without aids, a hunter/observer is generally forced to exercise prudence and discretion as to when to maintain stealth and when to become mobile. Therefore, a device to assist a hunter/observer in sustaining a stealthy composure without compromising mobility would provide a distinct advantage. An added benefit would be for the device to be equipped with features to further facilitate the hunter/observer in achieving the desired result of hunting/observing. A tenant of both stealth and mobility is transportability. Hunting/observing is mostly conducted on foot, so if the device itself is unwieldy it can become counter productive. Therefore, another benefit would be for the device to exhibit ease of transport and implementation.

Tree stands and blinds exist to assist a hunter/observer to overcome the problems associated with stealth and mobility. A tree stand provides a user with a vantage point by providing an observation post located at a higher elevation with respect to the prey/observed. A blind enables concealment by disguising the observation post as an object of the naturally, occurring, surrounding environment. Unfortunately, tree stands and blinds tend to be unwieldy. Furthermore, although blinds allow a hunter/observer to move about without detection, blinds tend to suppress functionality. A user can move about without detection but blinds force a user to direct his observations to designated viewing areas, resulting in a limited effective range of motion for the user, which translates into a user only being able to avail limited fields of fire/observation. Additionally, blinds pose an encumbrance to utilize the various hunter/observer aids and accessories that have been developed over the years. For instance, it is difficult to employ a spotting scope while attempting to conceal oneself within a blind.

It is an object of this invention to provide a hunting blind to be used with virtually any tree stand or observation post that is less limiting regarding range of motion and fields of fire/observation. It is a further object of this invention to provide value added features such as a safety rail that also serves as both a rifle/scope/camera rest and a curtain hanger. It is a further object of this invention to provide a means to hang hunter/observer accessories in within the concealed position and in the immediate vicinity of the user. An added benefit provided by this invention is the ability to quickly assemble and disassemble the device while in the field, and to easily transport the device on foot. Another added benefit of this invention is the ability to secure the device to a tree without damaging the tree due to the use of impaling spikes.

SUMMARY OF THE INVENTION

The invention relates to a blind for a tree stand or observation post that enables concealment with greater range of motion and fields of fire/observation than that exhibited by prior art. The device comprises of a back rest, a securing mechanism, and a safety rail that also serves as a firing/observing support and a curtain hanger.

The back rest is cushioned for added comfort, and a rear portion thereof is contoured to substantially receive a trunk of a tree. It is also provided with a securing mechanism comprising of a pair of straps and a ratcheting mechanism. The back rest is easily secured to a trunk of a tree with the use of the straps and ratcheting mechanism, thus obviating the need to impale the tree with spikes. A detachable and collapsible tubular framework extends from the back rest and defines a perimeter around the hunter/observer. This framework becomes the safety rail, which prevents a user from falling while in an elevated position. The position of the safety rail also permits the hunter/observer to employ it as a rest for a rifle, a bow, a scope, or a camera. The tubular framework further acts as a curtain rod to support a curtain, which would serve as the blind once erected. Having the tubular framework act as a safety rail, a rest, and a curtain rod imparts vast versatility to the device. The unique configuration of the device provides a user with nearly a three-hundred sixty degree (360°) field of fire/observation, along with a support to rest a rifle, bow, scope, or camera within that field of fire/observation. A user can be seated or standing and can make observations from all angles without compromising stealth.

The device comes equipped with a plurality of hooks that have adjustable support members for hanging various articles. These articles are hung within the concealment of the blind. The articles are then out of the user's area of operation, which further enhances the mobility of the user. Yet, the articles are concurrently immediately accessible to the user, which further enhancing the functionality of the device. The device can be easily and quickly detached from the tree. After detachment, minimal effort is required to disassembled and stow the device for easy transport while on foot. The device itself being compact and simplistic adds to the mobility of the user.

Avid hunters and nature observers are continuously looking for devices to assist with both stealth and mobility. A great advantage is imparted on such enthusiasts if they can employ a device that does both and provides added versatility as well.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
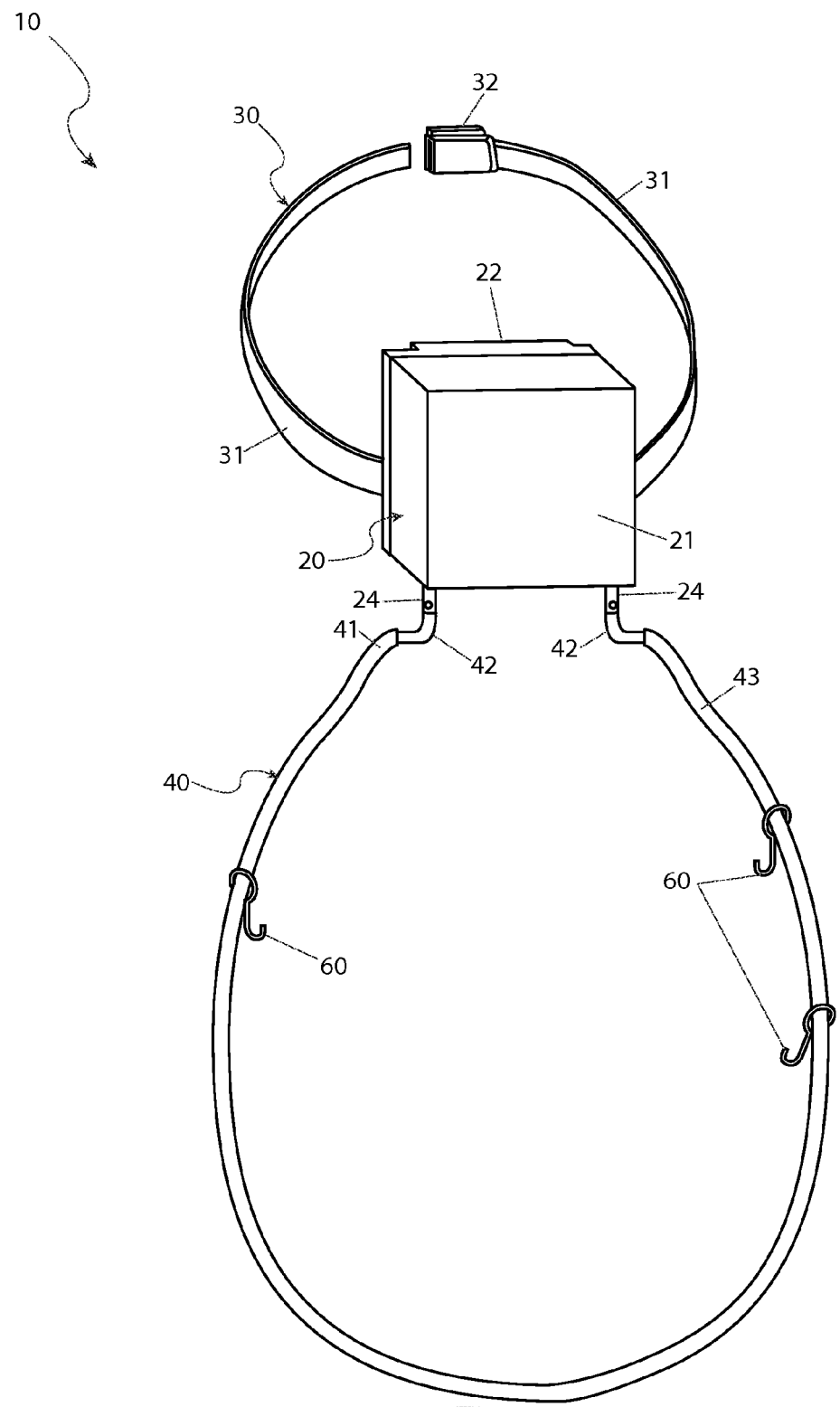
FIG. 1 is a front perspective view of the firing support hunting blind 10, in accordance with the present invention.

DESCRIPTIVE KEY 10 hunting blind
11 tree
12 tree stand
20 back rest
21 cushion
22 back plate
23 tree support member
24 tube attachment
30 securing mechanism for a tree stand
31 strap
32 ratchet mechanism
40 firing support
41 tube
42 end
43 covering
50 blind panel
52 sleeve
54 fastening mechanism
60 hook
80 fastener
82 spring pin
84 aperture
100 user

DETAILED DESCRIPTION OF THE PREFERRED EMBODIMENT

The best mode for carrying out the invention is presented in terms of its preferred embodiment, herein depicted within FIGS. 1 through 5. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

In accordance with the invention, the present disclosure will be made to certain embodiments, examples of which are illustrated in the accompanying drawings. Referring now to FIGS. 1 through 5, which depict a hunting blind (herein described as a "device") 10, where like reference numerals represent similar or like parts. All terminology is used for the sake of clarity and is not intended to limit the invention to the specific terminology selected and it is to be understood that each described element or part includes all technical equivalents that operate in a similar manner to accomplish similar functions.

As used herein, the term tree stand 12 refers to any type, design, or model of tree stand, including climbing stands, ladder stands, hanging stands, box stands, or any other similar open or enclosed platforms used by hunters 100. These types of tree stands typically include a platform secured to a tree 11 in order to elevate the user/hunter 100 to provide a better vantage point.

The device 10 provides concealed observation and a firing supported rifle rest 40 for use with the tree stand 12 at an elevated position or for use upon a ground surface. The device 10 is coupled to a tree 11, either at an upper position above the tree stand 12 or at a lower position above the ground surface to surround and conceal the user 100.

As shown in FIG. 1, the device 10 comprises a back rest 20, a securing mechanism 30, and a firing support 40. The device 10 includes a plurality of hooks 60 that are removably connected to the firing support 40. The hooks 60 provide an adjustable support member for hanging various articles in order to keep them off of the floor of the tree stand 12 or the ground surface.

The back rest 20 includes a cushion 21 affixed to a rigid back plate 22 using adhesives or equivalent means. The back plate 22 is a generally rectangular member and is fabricated of a strong, lightweight material, such as fiberglass, plastic, or lightweight metal. The lower end of the back plate 22 includes an integral tree support member 23 which provides a rearwardly protruding and curved form-fitting surface which contacts the tree 11 in a stabilizing manner (see FIG. 3).

The securing mechanism 30 includes a pair of straps 31 and a ratchet mechanism 32 for securely attaching the back rest 20 to the tree 11. The straps 31 are fabricated from a durable material, such as nylon or similar natural or synthetic materials. Each strap 31 has a free end and a sewn looped end portion being insertingly attached to a tube attachment 24. A pair of upright tube attachments 24 is rigidly affixed to opposing sides of the back plate 22 using fasteners 80 such as clips, screws, or the like. The ratcheting mechanism 32 is affixed to a free end of one (1) of the straps 31 and is adapted to receive the free end of the opposing strap 31 through a ratchet slot. Actuation of a handle portion of the ratchet mechanism 32 draws the free end of the opposing strap 31 inwardly, thus shortening its length and reducing the diameter of the securing mechanism 30 tightly around the tree 11.

The firing support 40 comprises a tubular framework having a round or rectangular cross-sectional shape which surrounds the tree stand 12 and user/hunter 100 during use. The firing support 40 is rigidly attached to the back rest 20 and is oriented perpendicularly to the tree 11 when the device 10 is in use. The firing support 40 supports a firearm or bow during firing and provides a safety guardrail for the user/hunter 100 when at an elevated position. The firing support 40 is fabricated from a strong and lightweight material, such as plastic, polycarbonate, or aluminum. It can be appreciated by one skilled in the art that other lightweight materials can be utilized without departing from the present invention.

In certain embodiments, the firing support 40 comprises a single circular section of frame tube 41 that attaches to the back plate 22. The tube 41 end portions are to be insertingly attachable to the tube attachment 24 and selectively secured using spring pin 82 and aperture 84 portions to form the generally circular perimeter around the user/hunter 100.

In certain embodiments, the firing support 40 includes a padded covering 43 wrapped around the exterior of the tube 41. The covering 43 is fabricated from a water resistant and durable padded material, such as foam. In the various embodiments of the device 10, the firing support 40 and the tube attachments 24 have a circular or a square cross-section.

Figure 2:
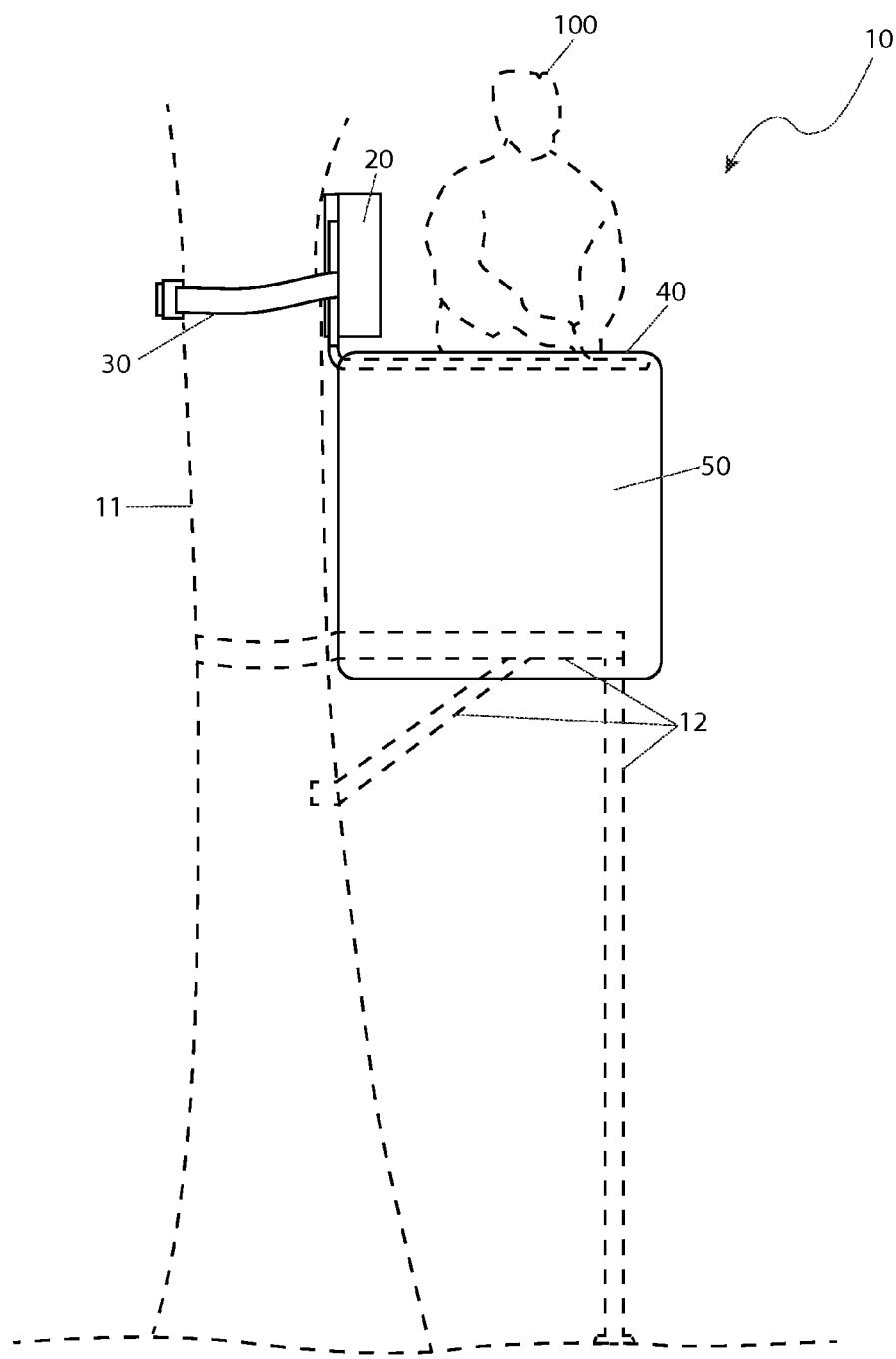
FIG. 2 is an environmental view of a firing support hunting blind 10, shown in use over a tree stand, in accordance with the present invention.

Referring now to FIG. 2, an environmental view of the device 10, shown in use over an existing tree stand, in accordance with the present invention, is disclosed. The device 10 is illustrated in use upon a tree 11 and covering the tree stand 12. The back rest 20 is removably secured around the tree 11 at the upper location via the securing mechanism 30. The firing support 40 extends outwardly from the back rest 20 and defines a perimeter around the tree stand 12 and the user/hunter 100. The blind panel 50 hangs downwardly from the firing support 40 to conceal the user/hunter 100, whether in the tree stand 12 or upon the ground surface.

The device 10 may be utilized with or without the blind panel 50. In such cases, the device 10 provides the support and stability of the firing support 40 alone. The blind panel 50 is fabricated from a lightweight material being slidingly attached to the firing support 40 (see FIG. 5).

Figure 3:
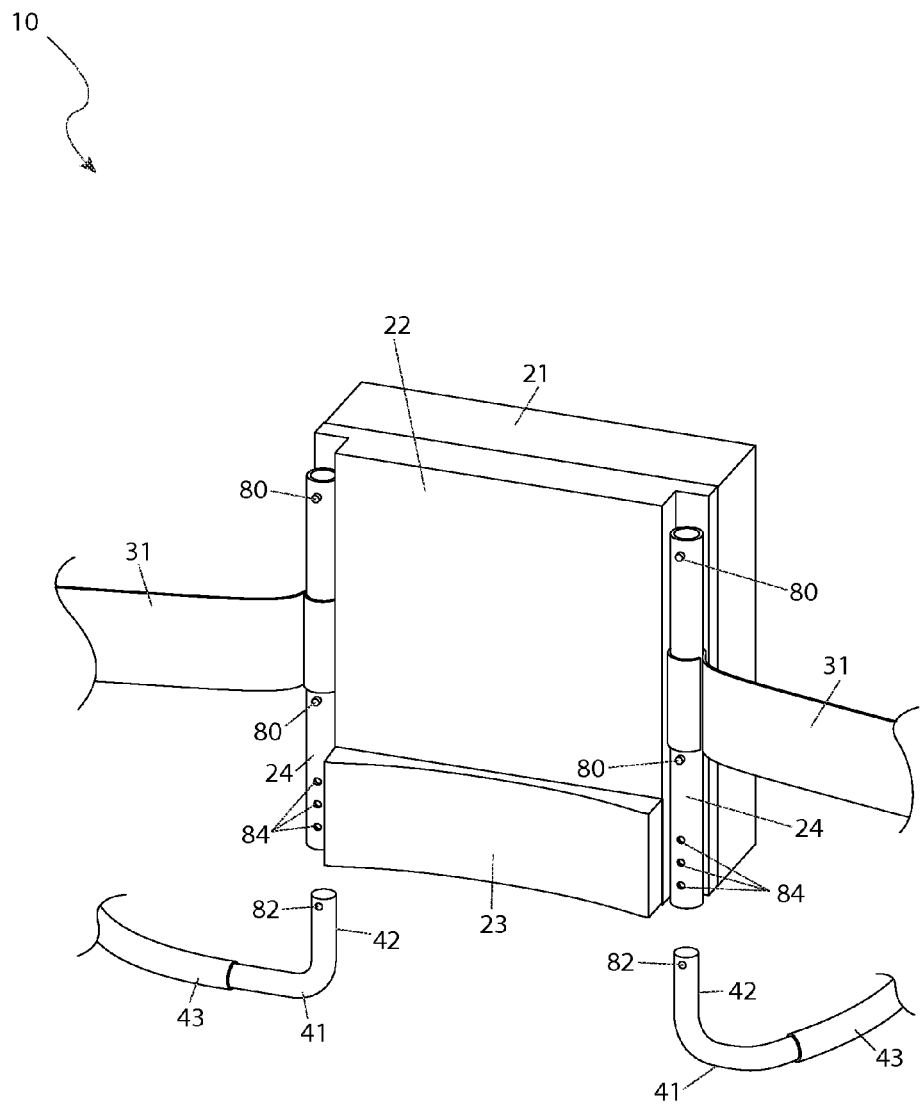
FIG. 3 is a partially exploded rear perspective view of the firing support hunting blind 10, in accordance with the present invention.
Figure 4:
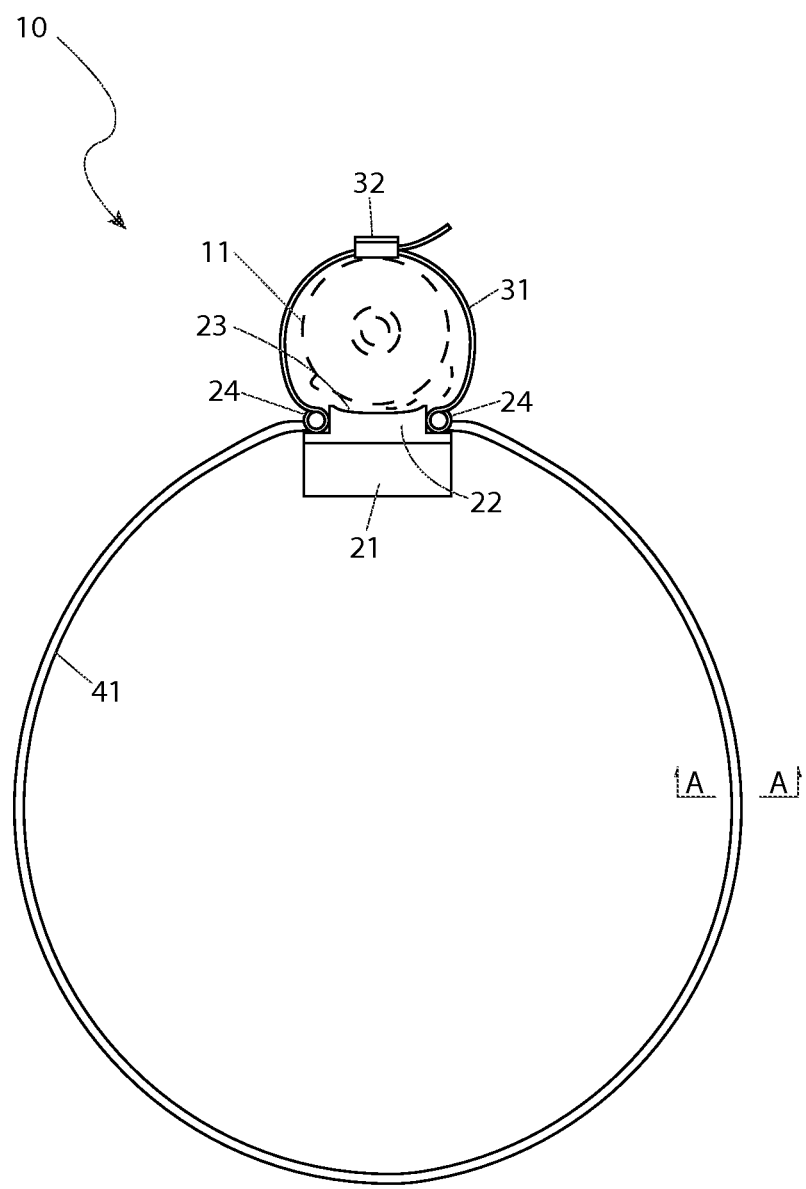
FIG. 4 is a top view of the firing support hunting blind 10, in accordance with the present invention; and, FIG. 5 is a cross section view of a blind panel portion 50 of the firing support hunting blind 10, in accordance with an alternate embodiment of the present invention.

Referring now to FIGS. 3 and 4, partially exploded and rear views of the firing support hunting blind 10, in accordance with the present invention, are disclosed. The lower end of the back plate 22 includes a tree support member 23 which provides an arcuate exterior surface for making stable contact with a portion of the circumference of the tree 11 when the device 10 is secured. The tube attachments 24 provide removable attachment of respective tube portions 41 of the firing support 40. Each end portion of the tube 41 comprises an "L"-shape having an upwardly extending and perpendicularly bent end portion 42. Each end 42 removably attaches to a respective tube attachment 24. The ends 42 have a diameter suitable sized and shaped to be inserted into an open lower end of the tube attachment 24. Each tube attachment 24 comprises a locking mechanism, preferably being a spring pin 82 or similar mechanism which provides selective and adjustable engagement into corresponding aperture portions 84 being arranged in a linear pattern and located along a bottom portion of the tube attachment 24.

In other embodiments, the firing support 40 comprises a pair of generally semi-circular frame tubes 41, being attached via a diametrically enlarged end of one (1) tube 41 and a normal end portion of the other tube 41.

Figure 5:
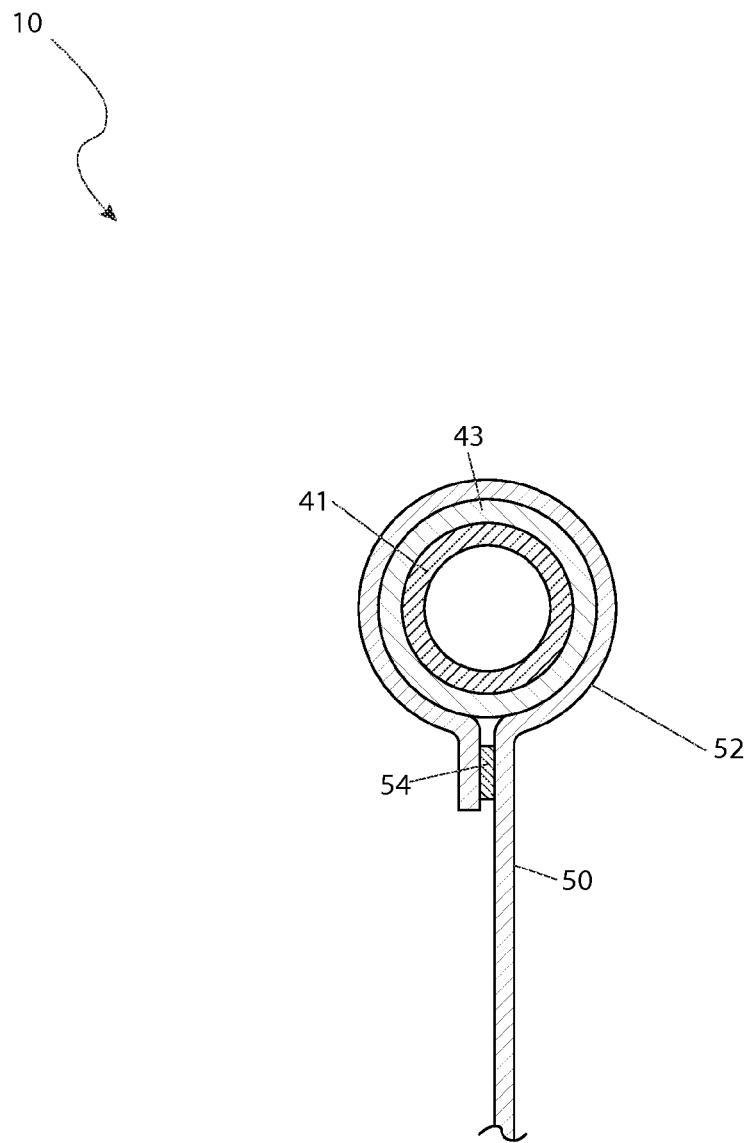

Referring now to FIG. 5, a cross section view of a blind panel 50 portion of the device 10, is disclosed. In another embodiment, the present invention 10 utilizes a removably attachable draped blind panel 50 further comprising a circularly-wrapped sleeve portion 52 disposed about the upper edge for receiving the firing support 40. It is envisioned that an upper edge portion of the sleeve 52 is preferably wrapped around the firing support 40 and fastened back upon itself via a fastening mechanism 54, preferably being a hook-and-loop-type fastener. The fastening mechanism 54 can comprise an equivalent means such as snap fasteners, or may be sewn together to form a tunnel feature. The position of the blind panel 50 is adjustable by sliding it along the firing support 40.

The blind panel 50 is to be fabricated from a lightweight material, such as nylon, polyester, or similar durable natural or synthetic fabric. In certain embodiments the blind panel 50 is imprinted with a camouflage pattern for blending into the surrounding environment. The firing support 40 is envisioned to comprise a padded covering 43 which surrounds an exterior surface of the tube 41 to provide protection and comfort to the user 100. The covering 43 is preferably fabricated from a water resistant and durable padded material such as plastic-coated urethane foam or equivalent material.

In other embodiments, the blind panel 50 is envisioned to comprise a plurality of apertures spaced apart along the upper edge for receiving the firing support 40 therethrough. The apertures can also include grommets for increased durability. In yet other embodiments the blind panel 50 may includes a plurality of individual sections. In certain other embodiments the blind panel 50 includes two (2) or more sections.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the device 10, it would be installed as indicated in FIGS. 1 and 2.

The method of utilizing the device 10 may be achieved by performing the following steps: procuring a model of the device 10 having a desired color and pattern; mounting an existing tree stand 12 to the tree 11 at a desired height off the ground surface; mounting the device 10 to the tree 11 at a desired distance above the tree stand 12 by positioning the back rest 20 at a corresponding location upon the tree 11 with the back plate 22 and tree support member 23 in contact with the surface of the tree 11; wrapping the strap portions 31 around the tree 11; securing the straps 31 using the ratcheting mechanism 32; attaching the firing support 40 to the back rest 20 by inserting the end portions 42 of the tubes 41 into the respective tube attachment portions 24; securing the tube 41 and tube attachment 24 portions together at a desired relative position using the spring pin 82 and aperture 84 portions; wrapping an upper edge portion of the blind panel 50 around the firing support 40; attaching the blind panel 50 around said firing support 40 by pressing the portions of the fastening mechanism 54 together; and, utilizing the device 10 to hunt game, observe wildlife, or similar activities. The device 10 may be positioned at a lower position upon the tree and above the ground surface, as desired.

The straps 31 are wrapped around the tree 11 and the free end of one (1) strap 31 is inserted into the ratchet mechanism 32. The ratchet mechanism 32 is actuated to draw in the inserted strap 31 to shorten its length and tighten the straps 31 around the tree 11.

It is understood that the firing support 40 can be attached to the back rest 20 before or after mounting the device 10 to the tree 11. In certain embodiments, the firing support 40 comprises a single circular section of frame tube 41, said tubes 41 are joined via insertion of diametrically enlarged and normal end portions. In like manner, the tube 41 end portions 42 are to be insertingly attachable to the tube attachments 24 and selectively secured thereto using spring pin 82 and aperture 84 portions to form the generally circular perimeter around the user/hunter 100. The firing support 40 can be easily and quickly detached from the back rest 20 for transportation to and from a hunting site.

The device 10 can be utilized with or without attachment of the blind panel 50. With the blind panel 50 draped over the firing support 40, the user/hunter 100 is concealed from the surrounding environment whether in the tree stand 12 or upon the ground surface. The user/hunter 100 can support and rest a rifle, bow, or other weapon upon the firing support 40 during firing for added stability. The firing support 40 also provides a safety guard to prevent the user/hunter 100 from falling from the tree stand 12 during firing.

A desired number of hooks 60 may be affixed to the firing support 40 to provide a means to temporarily suspend various hunting related articles, thus keeping them out of the way and easily accessible.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A hunting support device, comprising:
    a back rest;
    a securing mechanism attached to said back rest; and,
    a firing support member attached to said back rest;
    wherein said securing mechanism is adapted to support said hunting support device to a tree; and,
    wherein said firing support member is configured to support a firearm resting thereupon during firing of said firearm.

2. The device of claim 1, wherein said support member further comprises a rear side having a shape configured to correspond to at least a portion of a circumference of said tree.

3. The device of claim 1, wherein said securing mechanism further comprises:
    a pair of straps each comprising a looped end secured to one of said pair of tubular supports and a free end; and,
    a ratchet mechanism affixed to said free end of one of said pair of straps for adjustably connecting to said free end of an opposing one of said pair of straps.

4. The device of claim 1, further comprising a water-resistant and durable cover for an entire circumference of said curvilinear portion of said firing support.

5. The device of claim 4, wherein said firing support is a unitary member.

6. The device of claim 4, wherein said curvilinear portion further comprises a pair of conjoining semi-curvilinear portions.

7. The device of claim 4, further comprising at least one hook element suspended from said firing support.

8. A hunting support device, comprising:
    a back rest;
    a securing mechanism attached to said back rest;
    a firing support member attached to said back rest; and,
    a blind capable of being supported on said firing support member;
    wherein said securing mechanism is adapted to support said hunting support device to a tree; and,
    wherein said firing support member is configured to support a firearm resting thereupon during firing of said firearm, wherein said back rest further comprises:
    a rigid plate; a support member protruding rearwardly from a rear side of said plate; a pair of tubular supports each affixed to a rear side of said plate and bracketing said support member, each of said pair of tubular supports comprises a lower end having a connecting aperture; and a cushion affixed to and coextensive with a front side of said plate, wherein said firing support member comprises a tubular framework further having: a pair of end portions each releasably inserted into said connecting aperture of a respective tubular support; and a curvilinear portion attached to each of said pair of end portions; wherein a fastening means provides a height adjustable fastening of said firing support member within said pair of tubular supports; and wherein said curvilinear portion is oriented perpendicularly to said pair of end portions such that said curvilinear portion is oriented perpendicularly away from said back rest when said firing support member is attached to said pair of tubular supports.

9. The device of claim 8, wherein said support member further comprises a rear side having a shape configured to correspond to at least a portion of a circumference of said tree.

10. The device of claim 8, wherein said securing mechanism further comprises:
    a pair of straps each comprising a looped end secured to one of said pair of tubular supports and a free end; and,
    a ratchet mechanism affixed to said free end of one of said pair of straps for adjustably connecting to said free end of an opposing one of said pair of straps.

11. The device of claim 8, further comprising a water-resistant and durable cover for an entire circumference of said curvilinear portion of said firing support.

12. The device of claim 11, wherein said firing support is a unitary member.

13. The device of claim 11, wherein said curvilinear portion further comprises a pair of conjoining semi-curvilinear portions.

14. The device of claim 11, wherein said blind comprises:
    a resilient and lightweight blind panel; and,
    a sleeve portion disposed about an upper edge of said blind panel, further having a fastening element to create said sleeve portion;
    wherein said sleeve portion is removably attached about said curvilinear portion of said firing support.

15. The device of claim 11, wherein said blind comprises:
    a resilient and lightweight blind panel; and,
    a plurality of apertures spaced apart along an upper edge of said panel;
    wherein said plurality of apertures are configured to receive passage of said firing support therethrough such that said blind is suspended therefrom.

16. The device of claim 11, further comprising at least one hook element suspended from said firing support.

* * * * *